July 20, 1943. W. H. RUPP 2,324,954
REFINING OF MINERAL OILS
Filed Aug. 22, 1940
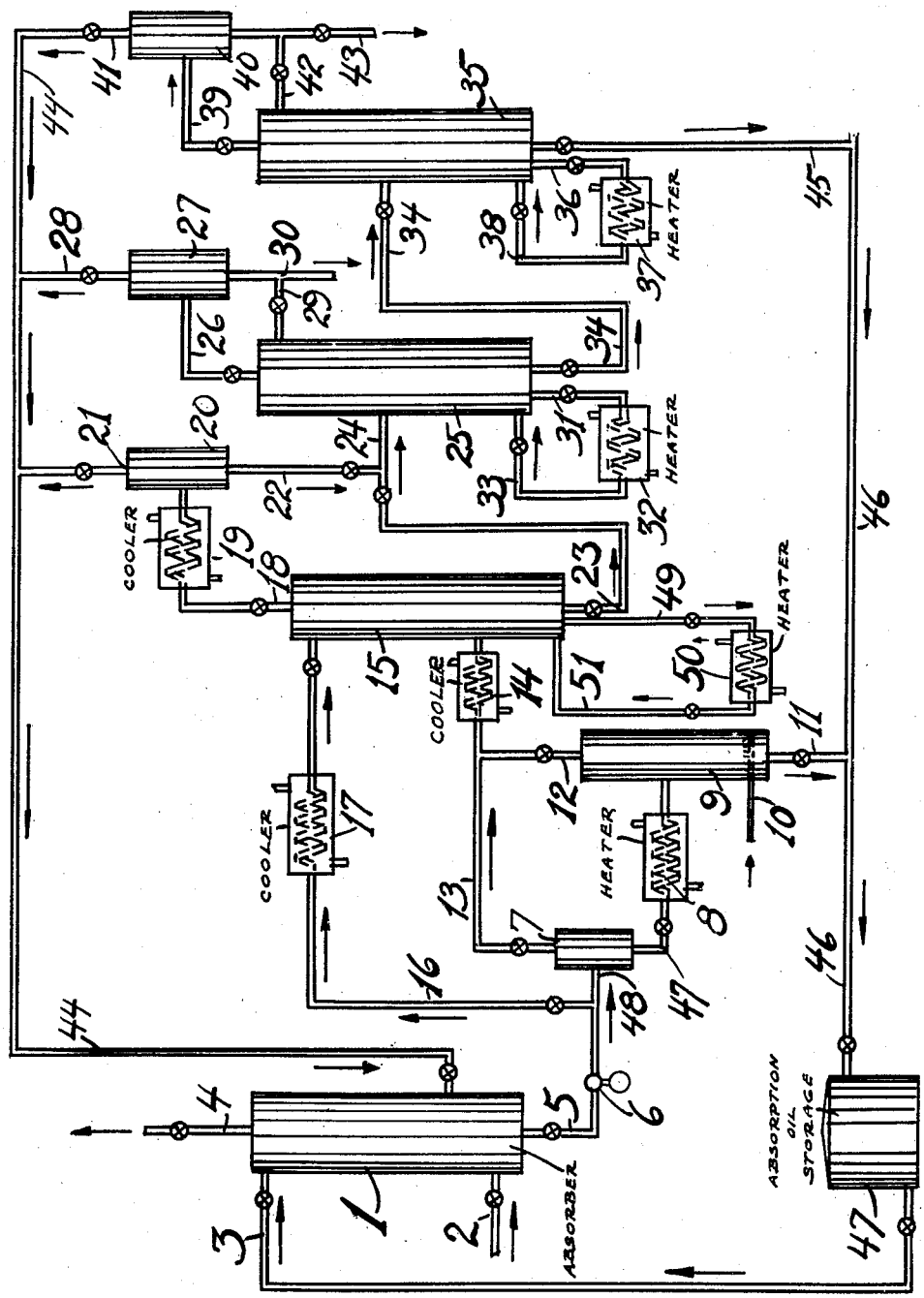
Walter H. Rupp Inventor
By P. L. Young Attorney Patented July 20, 1943

2,324,954

UNITED STATES PATENT OFFICE 2,324,954

REFINING OF MINERAL OILS

Walter H. Rupp, Elizabeth, N. J., assignor to Standard Oil Development Company, a corporation of Delaware Application August 22, 1940, Serial No. 353,632

5 Claims. (Cl. 196—8)

The present invention relates to the refining of mineral oils and is more particularly concerned with the recovery of valuable hydrocarbon constituents from vaporous mixtures containing the same. The invention is especially concerned with recovery of hydrocarbon constituents suitable for use in motor fuels and suitable as intermediate feed stocks from gases containing the same by an improved oil absorption operation. In accordance with the present process the absorption oil containing the absorbed constituents is removed from the absorption zone and handled in a particular manner by which it is possible to economically and efficiently remove and recover the absorbed constituents therefrom. This is accomplished by segregating the rich absorption oil into a plurality of streams and concentrating the absorbed constituents in one stream which stream is subsequently distilled in a manner adapted to remove and recover the absorbed constituents from the absorption oil which is recycled to the absorption zone.

In the refining of petroleum oils relatively large quantities of gases varying widely in hydrocarbon analysis are produced. These gases comprise various concentrations of butane, pentanes, and higher boiling hydrocarbon constituents which due to their physical properties may be partially or entirely readily included in motor fuels. These gases likewise contain various lower-boiling hydrocarbon constituents such as ethane and propane which constituents are desirable as valuable intermediate feed materials. It is therefore conventional refinery practice to segregate the valuable hydrocarbon constituents from vaporous mixtures containing the same by various procedures. For example, it is known in the art to remove and recover these desirable hydrocarbon constituents by contacting the feed gases with an absorption oil under suitable temperature and pressure conditions. In the usual oil absorption hydrocarbon recovery operation lean absorption oil is introduced into an absorption zone which usually comprises a treating tower or similar equipment in which it countercurrently contacts a stream of feed gas containing butanes, pentanes, and higher boiling constituents as well as lower boiling hydrocarbon constituents. The lean absorption oil is introduced into the top of the absorption zone while the gas containing the recoverable hydrocarbon constituents is introduced in or near the bottom of the absorption zone. Treated gases substantially free of desirable hydrocarbon constituents are removed from the top of the absorption zone while rich absorption oil containing the dissolved constituents is removed from the bottom of the tower and handled in a manner to separate and recover the dissolved hydrocarbon constituents.

In the usual oil absorption operation the method employed is to select the lowest boiling hydrocarbon which it is desired to absorb and to adjust the operating conditions to absorb the desired amount of this hydrocarbon. Although the lowest boiling hydrocarbon which it is desired to recover for utilization in motor fuels is butane, it is now common practice to adjust operating conditions to recover propane and propylene or other lower boiling constituents which are suitable for use as intermediate feed stocks for various polymerization, alkylation or related operations. In an efficiently designed absorption tower the partial pressure of this hydrocarbon, which is selected as the lowest boiling hydrocarbon which it is desired to recover in the absorption oil at the point of introduction of the feed gases, is substantially equivalent to the partial pressure of the hydrocarbon in the entering gas. This lowest boiling hydrocarbon generally termed the key component is usually butane, propane, or ethane. Thus the partial pressure of the key component in the hydrocarbon rich absorption oil at the point of withdrawal of the absorption oil from the absorption zone is substantially equivalent to the partial pressure of the key component in the entering feed gas stream. Normally the partial pressures of components having higher boiling points than the key component contained in the hydrocarbon rich absorption oil leaving the absorber will be considerably less than the partial pressures of these constituents in the entering gas. This is due to an insufficient amount of these constituents in the inlet gas to give a concentration in the rich absorption oil to produce a partial pressure near that of the inlet gas. The rich absorption oil is removed from the absorption zone and handled in a manner to remove and recover the absorbed hydrocarbons which are further refined if desired and to produce an absorption oil free of absorbed hydrocarbon which is recirculated to the absorption zone.

The distillation operation is usually conducted under conditions to remove overhead the absorbed hydrocarbons and to produce a lean oil bottoms fraction substantially completely free of absorbed hydrocarbons which is recycled to the absorption zone. While an operation of this character is entirely suitable when processing a feed gas mixture for the recovery of butane and higher boiling hydrocarbon constituents, it is not particularly desirable when the absorption operation is conducted under conditions to remove not only butane and higher boiling hydrocarbons, but to also remove from the feed gases relatively low boiling hydrocarbons such as propylene, ethylene and the like. When the rich absorption oil contains absorbed hydrocarbons having this wide volatility range and contains constituents varying for example from ethylene to amylene the high pressures required to condense the desirable absorbed fractions in the presence of ethylene fractions make fractionation in the presence of a relatively large quantity of heavy absorption oil impossible or commercially impractical. If the pressure were reduced in an effort to improve the critical relationship of the heavy ends the net result would be that the desired low boiling fractions could not be condensed which would result in excessive gas production and low liquid recovery efficiency. Furthermore, it would not be commercially practical to employ refrigeration due to the excessive expense incurred. In addition, it is not practical or feasible to fractionally remove the relatively low boiling constituents from the absorption oil in an initial stage and in a subsequent stage to fractionally remove the relatively high boiling absorbed constituents, due to the fact that the distillation efficiency is prohibitively impaired by the relatively large volume of relatively high boiling absorption oil present. This is particularly the case if an appreciable temperature differential exists between the highest boiling hydrocarbon constituents and the initial boiling point of the absorption oil which is extremely desirable with respect to the efficiency of the absorption operation.

I have now discovered a process by which it is possible to treat feed gases for the substantial complete removal of hydrocarbon constituents boiling in the range from ethylene to amylene and higher with an absorption oil the initial boiling point of which is substantially above the boiling point of the highest boiling hydrocarbon constituent recovered and by which the absorption oil containing the absorbed hydrocarbon may be subsequently treated in an efficient manner by which the absorbed hydrocarbons may be readily removed and segregated. In accordance with my process the rich absorption oil is divided into a plurality of streams and the dissolved constituents concentrated in one segregated relatively small amount of high boiling absorption oil. This segregated amount of high boiling absorption oil containing the entire quantity of absorbed hydrocarbons is passed through a plurality of fractionating stages in a manner to remove overhead and segregate the valuable desired absorbed hydrocarbons and to produce as a bottoms an absorption oil substantially free of absorbed hydrocarbons, which is recycled to the absorption zone. The process for my invention may be readily understood by reference to the attached drawing illustrating a modification of the same.

For purposes of illustration it is assumed that the feed gas is derived in the refining of petroleum oils and comprises hydrocarbon constituents containing from one to five and higher carbon atoms in the molecule. It is also assumed that it is desired to recover and segregate a fraction containing from three to four carbon atoms in the molecule and a fraction containing from about five to six carbon atoms in the molecule. The feed gases are introduced into absorption zone 1 by means of line 2. These gases flow upwardly through absorption zone 1 and counter-currently contact a suitable absorption oil which is introduced into the absorption zone 1 by means of line 3. Absorption zone 1 may comprise any suitable number of units arranged in any desirable manner and also contain adequate distributing and contacting means. Temperature and pressure conditions and other operating conditions are adjusted to absorb in the absorption oil hydrocarbon constituents containing three carbon atoms and higher in the molecule and to remove overhead by means of line 4 a treated gas which is substantially free of hydrocarbon constituents containing three and higher carbon atoms in the molecule. Under these conditions an appreciable quantity of hydrocarbons containing less than three carbon atoms in the molecule is also absorbed in the absorption oil. The rich absorption oil containing the dissolved hydrocarbon constituents is removed from absorption zone 1 by means of line 5, and a portion of the same passed by means of pump 6 and line 48 into a zone 7, in which vaporous constituents are removed overhead by means of line 13. The unvaporized bottoms are withdrawn from zone 7 by means of line 47, passed through heater 8, and introduced into an initial stripping zone 9. Stripping zone 9 is provided with suitable stripping means such as stripping medium introduced through line 10 and is operated under temperature and pressure conditions for removing overhead by means of line 12, the entire quantity of the dissolved hydrocarbons, as well as a relatively small amount of the relatively low boiling constituents of the absorption oil. The remaining absorption oil, stripped completely free of dissolved hydrocarbons, is removed from initial stripping zone 9 by means of line 11 and passed to absorption oil storage 41 by means of line 46. The overhead vaporous product removed from initial or primary stripping zone 9 by means of line 12, which comprises hydrocarbon constituents dissolved in that portion of the rich agsorption oil segregated by means of line 48, as well as a relatively small quantity of the relatively low boiling constituents of the absorption oil, is combined with the vapors removed from flash zone 7 by means of line 13, the entire quantity passed through cooler 14, and introduced into the lower section of a reabsorption zone 15. The rich absorption oil withdrawn from absorption zone 1 by means of line 5, which was not passed to zone 7, by means of line 48 is segregated by means of line 16, passed through cooler 17, and introduced into the upper section of reabsorption zone 15. The partially vaporous product introduced into the lower section of reabsorption zone 15, and the rich absorption oil introduced into the upper section of reabsorption zone 15 flow in a counter-current relationship under conditions adapted to reabsorb in the smaller volume of absorption oil the entire quantity of hydrocarbon constituents absorbed from the feed gases in the absorption zone. Undissolved vaporous fractions are removed overhead from reabsorption zone 15 by means of line 18, passed through cooler 19, and introduced into separation drum 20. Uncondensed fractions are removed overhead from separation zone 20 by means of line 21 and passed as recycled gas into the lower section of absorption zone 1 by means of line 44. The desired temperature is maintained in the bottom of reabsorption zone 15 by withdrawing a portion of the bottoms by means of line 49, heating the same in heater 50 and returning the heated portion to 15 by means of line 51. By this method the degree of stripping of lower boiling fractions of one and two carbon atoms in the molecule from the higher boiling three and four carbon atoms can be varied and controlled to give a final product containing substantially no two carbon atom molecules. The smaller volume of the absorption oil containing dissolved therein substantially the entire quantity of hydrocarbon constituents removed from the feed gases, is withdrawn from reabsorption zone 15 by means of line 23, and combined with the condensate separated from separation zone 20 by means of line 22. This mixture is handled in a manner to fractionally remove and segregate the desired dissolved hydrocarbon fractions. This is preferably accomplished, with respect to the operation being described, by introducing the mixture into a secondary stripping zone 25 in which temperature and pressure conditions are regulated to remove overhead by means of line 26 a hydrocarbon fraction containing three and four carbon atoms in the molecule. Suitable fractionating means are provided in secondary stripping zone 25 to secure this result. The overhead product is passed through separation zone 27 from which uncondensed vapors are removed by means of line 28 and recycled to absorption zone 1 by means of line 44 as described. The condensate, comprising hydrocarbon constituents containing three and four carbon atoms in the molecule, is removed from separation drum 27 by means of line 30 and handled or further treated in any manner desired. A suitable portion of the condensate may be returned as reflux to zone 25 by means of line 29. The desired temperature is maintained in the bottom of secondary stripping zone 25 by withdrawing a portion of the bottoms by means of line 31, heating the same in heater 32, and returning the heated portion by means of line 33. The absorption oil, free of hydrocarbon constituents containing three and four carbon atoms in the molecule, is withdrawn from secondary distillation zone 25 by means of line 34 and introduced into a final or tertiary stripping zone 35. Temperature and pressure conditions are regulated and suitable fractionating and stripping means are provided so that the remaining dissolved hydrocarbon constituents are removed overhead by means of line 39. This overhead fraction is passed to separation zone 40 from which uncondensed fractions are removed overhead by means of line 41 and recycled to the absorption zone 1 as described. The condensate, comprising hydrocarbon constituents containing from five and higher carbon atoms in the molecule, is withdrawn from separation drum 40 by means of line 43 and further processed or refined in any manner desirable. A sufficient quantity of the condensate is returned as reflux to final stripping zone 35 by means of line 42. A suitable temperature is maintained in zone 35 by withdrawing a portion of the bottoms by means of line 36, heating the same in heater 37 and returning the same to the zone by means of line 38. The absorption oil, substantially completely free of dissolved hydrocarbons, is removed as a bottoms from zone 35 by means of line 45 and passed to absorption oil storage 47 by means of line 46 along with the absorption oil removed from zone 9 by means of line 11.

The process of the present invention may be widely varied. The operation may be adapted for the removal, recovery and segregation of hydrocarbon constituents which boil over a relatively wide range from gaseous mixtures containing the same. The process, however, is particularly adapted for the recovery of hydrocarbon constituents from gases secured in the refining of petroleum oils. It is especially suitable for the recovery and segregation of a hydrocarbon fraction having a relatively low boiling point, as for example a fraction having a boiling point in the range of butane and propane and ethane and for the recovery and segregation of a hydrocarbon fraction having a relatively high boiling point, as for example a fraction having a boiling point in the range of butane, pentane, and the like, from feed gases containing a mixture of these constituents. By employing the present invention it is possible to balance the operation in a manner that substantially complete recovery of desirable vaporous constituents is secured from the feed gases containing the same and in a manner that the quantity of absorption oil utilized for the absorption of the constituents is adjusted so that it is possible to fractionally segregate the respective dissolved hydrocarbon constituents in an efficient and economical manner.

The absorption oil may be any suitable medium which has a preferential selectivity for the desirable vaporous constituents and will depend upon the character of the feed gases and upon the particular constituent which it is desired to recover. For example in an operation in which it is desired to recover and segregate hydrocarbons having from two to five and higher carbon atoms in the molecule from feed gases produced in the refining of petroleum oils it is preferred that the absorption oil boil in the general range from about 300° F. to 450° F. preferably in the range from about 325° F. to 400° F. The oil should be a relatively clean stock and have a gravity °A. P. I. in the range from about 37 to 50.

The quantity of absorption oil employed per volume of feed gas will depend upon general operating conditions, as well as upon the character of the feed gases and the type of hydrocarbon constituents which it is desired to recover. In general when employing an absorption oil of the above inspections, and when treating feed gases produced in petroleum oil refining operations which comprise hydrocarbon constituents containing from two to five and higher carbon atoms in the molecule, when about 40 to 50 gallons of oil per thousand cubic feet of gas are employed a propane recovery of 40% to 60% of the 3 carbon atom molecules in the feed gases can be expected.

Pressure and temperature conditions in the absorption in general fall in the range from about 60 to 100 pounds per square inch, and in the range from about 50° F. to 100° F. The invention applies to any absorber conditions normally practiced.

The rich absorption oil withdrawn from the absorption zone may be segregated in any manner desired. The manner in which the absorption oil is split with respect to the quantity of the two streams will of course depend upon general operating conditions. In general the stream passed directly to the reabsorption zone should be as small as possible and yet be sufficient to secure substantially complete reabsorption of the vaporous constituents in the reabsorption zone. The stream passed directly to the reabsorption zone may comprise from 15% to 60% of the total rich absorption oil stream withdrawn from the bottom of the absorption zone. In general, the stream passed directly to the reabsorption zone should comprise from 20% to 40% of the rich absorption oil stream withdrawn from the absorption zone.

The rich absorption oil stream not passed directly to the reabsorption zone is preferably flashed in a manner to secure a maximum vaporization of the hydrocarbon constituents. The envaporized portions are passed into an initial stripping zone which is operated to completely free the absorption oil of dissolved hydrocarbon constituents and to remove overhead with these hydrocarbon constituents some relatively low boiling constituents of the absorption oil. In general the initial stripping operation is conducted so as to completely free the absorption oil of dissolved hydrocarbon constituents which is best secured by removing overhead from 1% to 5% of the lower boiling constituents of the absorption oil itself.

Temperature and pressure conditions in reabsorption zone 15 are in general regulated so as to substantially completely reabsorb in the smaller quantity of absorption oil, all desired hydrocarbon constituents which were initially absorbed in the initial absorption zone. For example, when reabsorbing hydrocarbon constituents containing from 3 to 5 atoms in the molecule in the reabsorption zone, it is preferred that the pressure be about 90 lb./sq. in. and that the temperature be about 75° F.

The smaller quantity of absorption oil containing all the desired hydrocarbons dissolved therein is handled to remove and segregate the desired hydrocarbon fractions and to produce an absorption oil free of dissolved hydrocarbons. This may be accomplished by various procedures, depending upon the character of the absorption oil and upon the character of the dissolved hydrocarbon constituents present. For example, when segregating a propane-butane fraction and a pentane and higher boiling fraction from hydrocarbon feed gases, it is preferred that the operation be carried out in two stages in which the temperature and pressure conditions in the initial stripping stage are regulated in a manner that the propane-butane fraction be removed overhead and be readily condensable. This is accomplished by distilling the absorption oil removed from the reabsorption zone in a secondary stripping zone operated at a temperature in the range of about 150 lb./sq. in. and at a temperature of about 90° F. The bottoms removed from the secondary stripping zone are fractionated in a final stripping zone operated at a pressure of about 50 lb./sq. in. and at a temperature of about 90° F. The overhead products removed from the respective zones are condensed and handled as desired while the absorption oil is recycled to the absorption zone.

What I claim as new and wish to protect by Letters Patent is:

1. An improved process for recovering and separating into narrow fractions a hydrocarbon mixture of low boiling and readily condensible components from a mixture thereof with non-condensible components, which comprises absorbing the low-boiling readily condensible components along with some non-condensible components in an absorption oil in a primary absorption zone, separating the rich oil into two fractions, stripping the absorbed components completely from one portion thereof in a primary stripping zone and returning that portion directly to the absorption zone, reabsorbing and concentrating the stripped components in the second portion of the rich absorption oil under fractionating conditions, whereby the desired low boiling readily condensible components are retained in the oil and the non-condensible components are vaporized therefrom, fractionating the desired absorbed components into narrow cuts while in the presence of the absorption oil, recovering the second portion of absorption oil free from absorbed components and returning the same to the primary absorption zone.

2. Process according to claim 1 in which 15 to 60% of the rich absorption oil is stripped and returned directly to the primary absorption zone.

3. Process according to claim 1 in which 20 to 40% of the absorption oil is stripped in the primary stripping zone and 1 to 5% of the absorption oil is stripped off along with the absorbed constituents.

4. An improved process for recovering and separating narrow fractions of low boiling hydrocarbons from their mixtures with non-condensible gaseous hydrocarbons, which comprises scrubbing the mixture with an absorption oil under conditions adapted to remove the entire quantity of the readily liquefiable constituents together with a small amount of the non-condensible constituents, dividing the rich absorption oil into two portions, completely stripping the absorbed constituents from one portion of the oil and returning that portion of the absorption oil directly to the absorption stage, passing the stripped constituents in counter-current contact with the other portion of the absorbed oil in a reabsorption and fractionating zone under conditions adapted to vent from the top only gaseous constituents, and recovering an absorption oil containing only readily condensible constituents, the proportions of the readily condensible constituents to the absorption oil being substantially greater than in the original rich oil, fractionating the readily liquefiable constituents in the presence of the absorption oil to produce narrow fractions and a completely stripped absorption oil and returning the absorption oil to the primary stage.

5. An improved method for recovering and fractionating low boiling and easily condensible fractions absorbed in an absorption oil, which comprises separating the rich absorption oil containing the absorbed fractions into two portions, at least one of which represents an amount of absorption oil less than 60% of the original absorption oil, and concentrating by vaporization and reabsorption all the absorbed constituents of both portions into that portion of the absorption oil which represents less than 60% of the original absorption oil, and fractionating the thus concentrated absorbed and reabsorbed constituents into narrow cuts while in the presence of the absorption oil.

WALTER H. RUPP.